US012631052B1

(12) United States Patent
Ebrahimzadeh

(10) Patent No.: US 12,631,052 B1
(45) Date of Patent: May 19, 2026

(54) AUTOMATICALLY-DEACTIVATED CHILD SAFETY LOCK SYSTEM

(71) Applicant: David J. Ebrahimzadeh, New York, NY (US)

(72) Inventor: David J. Ebrahimzadeh, New York, NY (US)

( * ) Notice: Subject to any disclaimer, the term of this patent is extended or adjusted under 35 U.S.C. 154(b) by 0 days.

(21) Appl. No.: 19/174,094

(22) Filed: Apr. 9, 2025

(51) Int. Cl.
*E05B 77/02* (2014.01)
*E05B 77/26* (2014.01)

(52) U.S. Cl.
CPC ............ *E05B 77/02* (2013.01); *E05B 77/265* (2013.01)

(58) Field of Classification Search
None
See application file for complete search history.

(56) References Cited

U.S. PATENT DOCUMENTS

| | | | | |
|---|---|---|---|---|
| 11,193,312 | B1 * | 12/2021 | Weng | B60R 25/01 |
| 2021/0140203 | A1 * | 5/2021 | Szczerba | E05B 85/12 |
| 2022/0154499 | A1 * | 5/2022 | Konrad | E05B 77/02 |

* cited by examiner

*Primary Examiner* — Thomas S McCormack
(74) *Attorney, Agent, or Firm* — Clements Bernard Walker; Christopher L. Bernard

(57) ABSTRACT

An automatically-deactivated child safety lock system for use within a vehicle includes: an child lock system configured to selectively disconnect an interior latch controller from a door latch mechanism, thus selectively deactivating the interior latch controller; and an override system configured to receive an override signal from the vehicle and reconnect the interior latch controller with the door latch mechanism, thus reactivating the interior latch controller.

19 Claims, 2 Drawing Sheets

AUTOMATICALLY-DEACTIVATED CHILD SAFETY LOCK SYSTEM

TECHNICAL FIELD

This disclosure relates to child safety locks and, more particularly, to automatically deactivated child safety locks.

BACKGROUND

Child safety locks in the rear seats of cars have evolved over decades, driven by an increasing awareness of the dangers children face in vehicles and the need to develop protective measures to safeguard them. In the early days of automobile manufacturing, cars were designed with little regard for passenger safety, let alone for the specific needs of children. In fact, the concept of passenger safety was almost nonexistent, as vehicles were designed primarily for performance and utility. As cars became an essential part of everyday life, especially for families, it became apparent that children, particularly those seated in the rear, were vulnerable to injury or death in the event of an accident.

The shift toward greater attention to child safety in vehicles began in the 1960s and 1970s as public awareness of traffic accidents and child fatalities grew. During this time, the U.S. government established the National Highway Traffic Safety Administration (NHTSA) in 1970, which started to regulate car safety standards, including those aimed at children. The tragic consequences of unrestrained children in vehicles and the rise of motor vehicle accidents prompted safety experts and manufacturers to investigate how to better protect young passengers.

In the early 1970s, General Motors (GM) became one of the first major automobile manufacturers to introduce child safety locks in the rear doors of their vehicles. This simple yet crucial innovation aimed to prevent children from opening the rear doors from the inside, especially in the event of sudden stops or accidents. The child safety lock was a mechanical device typically engaged by a lever or pin that could only be accessed from the outside of the door, making it impossible for a child to operate it while seated in the back. This feature became a revolutionary safety addition that gained traction with other automakers, and by the 1980s, it was a standard feature in most cars on the market.

By the 1990s, automakers had refined the design of child safety locks, and the feature became standard across the industry. As new technologies emerged in the 2000s, the design of child safety locks continued to evolve. Some vehicles incorporated electronic child locks, which could be engaged and disengaged remotely via the car's key fob or an onboard control panel. This added convenience and ensured that parents and drivers could more easily manage the safety of rear-seat passengers.

In addition to electronic child locks, many modern vehicles now feature sensors and alerts that can detect if a child is still in the car, a feature that is especially valuable in preventing hot-car deaths. These systems notify the driver if a child has been left behind, providing an added layer of protection, especially in situations where parents or caregivers may forget to remove the child from the car. Furthermore, modern safety features, like rear-seat cameras, airbags, and side-impact protection, complement the child safety locks, contributing to an overall safer environment for children in the car.

SUMMARY OF DISCLOSURE

An automatically-deactivated child safety lock system for use within a vehicle includes: an child lock system configured to selectively disconnect an interior latch controller from a door latch mechanism, thus selectively deactivating the interior latch controller; and an override system configured to receive an override signal from the vehicle and reconnect the interior latch controller with the door latch mechanism, thus reactivating the interior latch controller.

One or more of the following features may be included. The child lock system may be a mechanical child lock system configured to selectively mechanically disconnect the interior latch controller from the door latch mechanism, thus selectively mechanically deactivating the interior latch controller. The interior latch controller may be a mechanical latch controller that is mechanically coupled to the mechanical child lock system. The mechanical latch controller may be configured to provide a mechanical unlatch signal to the mechanical child lock system. The mechanical child lock system may be selectively engageable via a mechanical switch located within a doorjamb of the vehicle. The child lock system may be an electrical child lock system configured to selectively electrically disconnect the interior latch controller from the door latch mechanism, thus selectively electrically deactivating the interior latch controller. The interior latch controller may be an electrical latch controller that is electrically coupled to the electrical child lock system. The electrical latch controller may be configured to provide an electrical unlatch signal to the electrical child lock system. The electrical child lock system may be selectively engageable via an electrical switch positioned proximate a driver of the vehicle. The override signal may be an electrical override signal. The electrical override signal may be provided by the vehicle in the event of an emergency situation concerning the vehicle. The electrical override signal may be provided by the vehicle in the event of an accident concerning the vehicle.

An automatically-deactivated child safety lock system for use within a vehicle includes: an interior latch controller; a door latch mechanism; an child lock system configured to selectively disconnect the interior latch controller from the door latch mechanism, thus selectively deactivating the interior latch controller; and an override system configured to receive an override signal from the vehicle and reconnect the interior latch controller with the door latch mechanism, thus reactivating the interior latch controller.

One or more of the following features may be included. The child lock system may be a mechanical child lock system configured to selectively mechanically disconnect the interior latch controller from the door latch mechanism, thus selectively mechanically deactivating the interior latch controller. The interior latch controller may be a mechanical latch controller that is mechanically coupled to the mechanical child lock system. The mechanical latch controller may be configured to provide a mechanical unlatch signal to the mechanical child lock system. The mechanical child lock system may be selectively engageable via a mechanical switch located within a door jamb of the vehicle. The child lock system may be an electrical child lock system configured to selectively electrically disconnect the interior latch controller from the door latch mechanism, thus selectively electrically deactivating the interior latch controller. The interior latch controller may be an electrical latch controller that is electrically coupled to the electrical child lock system. The electrical latch controller may be configured to provide an electrical unlatch signal to the electrical child lock system. The electrical child lock system may be selectively engageable via an electrical switch positioned proximate a driver of the vehicle. The override signal may be an electrical override signal. The electrical override signal may be provided by the vehicle in the event of an emergency situation concerning the vehicle. The electrical override signal may be provided by the vehicle in the event of an accident concerning the vehicle.

An automatically-deactivated child safety lock system for use within a vehicle includes: an child lock system configured to selectively disconnect an interior latch controller from a door latch mechanism, thus selectively deactivating the interior latch controller; and an override system configured to receive an override signal from the vehicle and reconnect the interior latch controller with the door latch mechanism, thus reactivating the interior latch controller; wherein the child lock system is a mechanical child lock system configured to selectively mechanically disconnect the interior latch controller from the door latch mechanism, thus selectively mechanically deactivating the interior latch controller, and wherein the interior latch controller is a mechanical latch controller that is mechanically coupled to the mechanical child lock system.

One or more of the following features may be included. The mechanical latch controller may be configured to provide a mechanical unlatch signal to the mechanical child lock system. The mechanical child lock system may be selectively engageable via a mechanical switch located within a doorjamb of the vehicle. The override signal may be an electrical override signal. The electrical override signal may be provided by the vehicle in the event of an emergency situation concerning the vehicle. The electrical override signal may be provided by the vehicle in the event of an accident concerning the vehicle.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
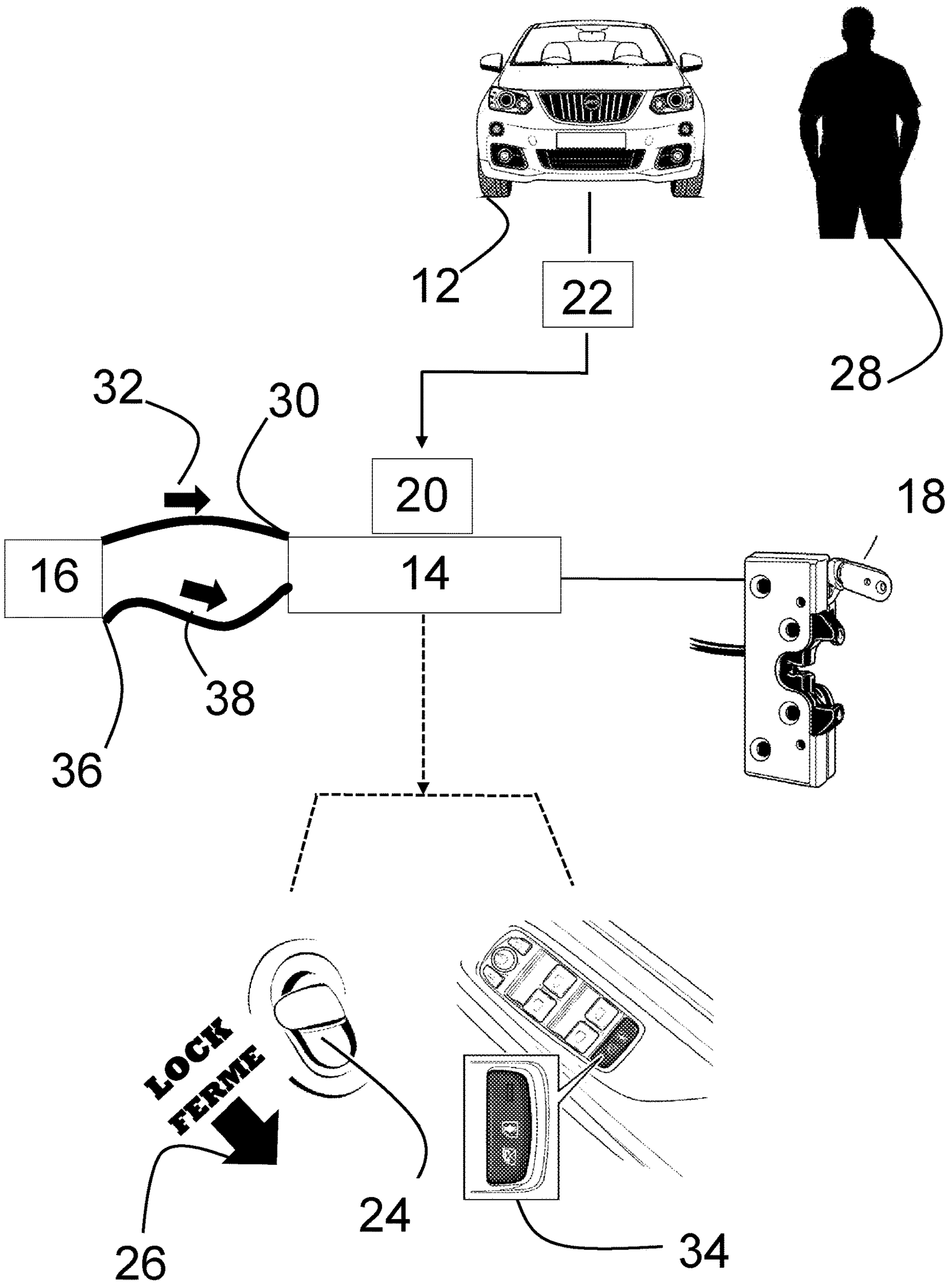
FIG. 1 is a diagrammatic view of an automatically-deactivated child safety lock system according to an embodiment of the present disclosure.

Referring to FIG. 1, there is shown an automatically-deactivated child safety lock system (e.g., automatically-deactivated child safety lock system 10) for use within a vehicle (e.g., vehicle 12). While child safety lock systems are important for ensuring that children e.g., do not open the rear door of the vehicle (e.g., vehicle 12) while the vehicle (e.g., vehicle 12) is in motion, these child safety lock systems may prove to be quite dangerous in the event of a accident or an emergency situation.

For example, assume that a vehicle (e.g., vehicle 12) is involved in an accident, catches on fire and that the front seat occupants are knocked unconscious in the accident. Unfortunately, the rear seat passengers (e.g., the children) may not be able to escape from the burning car because the child safety lock system disabled the operation of the interior door latches.

Accordingly and as will be discussed below in greater detail, the automatically-deactivated child safety lock system (e.g., automatically-deactivated child safety lock system 10) may be configured to automatically disable any child safety lock system in the event of such an accident or an emergency situation, thus enabling operation of the interior door latches. Therefore and if such an accident occurs, the rear seat passengers (e.g., the children) would be able to safely escape the burning vehicle.

The automatically-deactivated child safety lock system (e.g., automatically-deactivated child safety lock system 10) may include a child lock system (e.g., child lock system 14) configured to selectively disconnect an interior latch controller (e.g., interior latch controller 16) from a door latch mechanism (e.g., door latch mechanism 18), thus selectively deactivating the interior latch controller (e.g., interior latch controller 16).

The child lock system (e.g., child lock system 14) may be incorporated into (i.e., a portion of) the door latch mechanism (e.g., door latch mechanism 18). Alternatively, the child lock system (e.g., child lock system 14) may be separate from the door latch mechanism (e.g., door latch mechanism 18).

As discussed above, this child lock system (e.g., child lock system 14) in the rear doors of a vehicle (e.g., vehicle 12) may be a crucial safety feature designed to prevent children from accidentally opening the doors while the vehicle is in motion and/or leaving a non-moving vehicle when they are not supposed to. This mechanism is particularly important for families with young children, as it helps reduce the risk of injury by ensuring that rear passengers cannot exit the vehicle without adult supervision. Typically, this child lock system (e.g., child lock system 14) is located on the inner edge of the rear doors near the latch mechanism (e.g., door latch mechanism 18). It is typically manually activated by e.g., flipping a small switch or turning a lever, which engages the lock and disables the interior door handle (e.g., interior latch controller 16). Once engaged, passengers inside the vehicle (e.g., vehicle 12) cannot open the rear doors from the inside. However, the exterior door handle remains fully functional, allowing an adult to open the door from outside the vehicle (e.g., vehicle 12) as needed.

To deactivate a traditional child lock system (e.g., child lock system 14), the switch or lever must be manually returned to its original position, restoring normal operation of the interior door handle (e.g., interior latch controller 16). Typically, child lock systems (e.g., child lock system 14) are mechanical in nature, making them highly reliable and easy to use. However, some modern vehicles may integrate child locks into the central locking system, allowing the driver to activate or deactivate them with a button from the driver's seat.

In order to overcome the above-described shortcomings of the traditional child lock system (e.g., child lock system 14) in which rear seat passengers (e.g., children) may not be able to exit a vehicle (e.g., vehicle 12) in the event of an accident and/or an emergency situation, the automatically-deactivated child safety lock system (e.g., automatically-deactivated child safety lock system 10) may include an override system (e.g., override system 20) configured to enable the rear seat passengers to flee the vehicle (e.g., vehicle 12) in the event of such an accident/emergency situation.

Specifically, the override system (e.g., override system 20) may be configured to receive an override signal (e.g., override signal 22) from the vehicle (e.g., vehicle 12) and reconnect the interior latch controller (e.g., interior latch controller 16) with the door latch mechanism (e.g., door latch mechanism 18), thus reactivating the interior latch controller (e.g., interior latch controller 16).

For example, the child lock system (e.g., child lock system 14) may be a mechanical child lock system (e.g., child lock system 14) configured to selectively mechanically disconnect the interior latch controller (e.g., interior latch controller 16) from the door latch mechanism (e.g., door latch mechanism 18), thus selectively mechanically deactivating the interior latch controller (e.g., interior latch controller 16).

The mechanical child lock system (e.g., child lock system 14) may be selectively engageable via a mechanical switch (e.g., mechanical switch 24) located within a doorjamb (e.g., doorjamb 26) of the vehicle (e.g., vehicle 12). Accordingly and through the use of the mechanical switch (e.g., mechanical switch 24) located within the doorjamb (e.g., door jamb 26) of the vehicle (e.g., vehicle 12), the driver (e.g., driver 28) of the vehicle (e.g., vehicle 12) may selectively activate/deactivate the mechanical child lock system (e.g., child lock system 14).

Figure 2B:
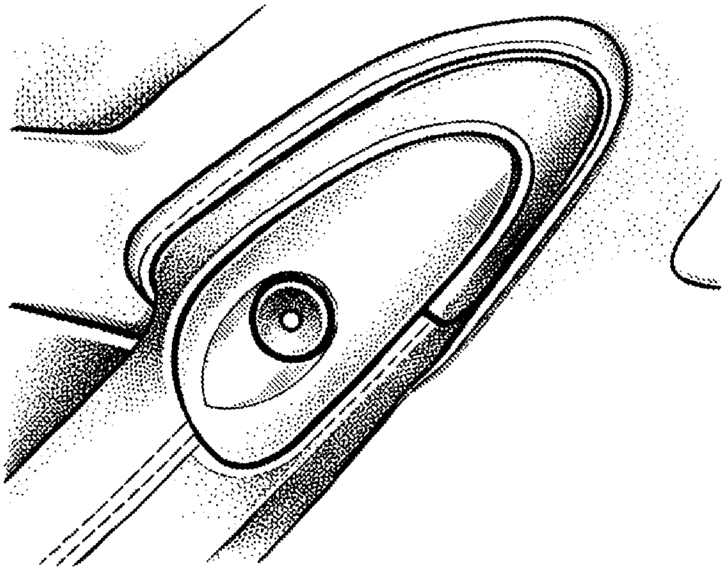
FIGS. 2A-2B are images of various latch controllers for use with the automatically-deactivated child safety lock system of FIG. 1 according to an embodiment of the present disclosure.
Figure 2A:
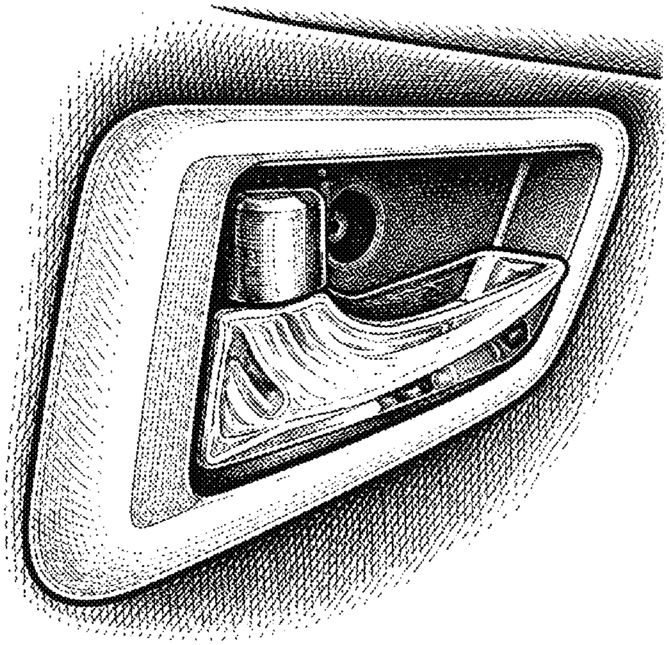

The interior latch controller (e.g., interior latch controller 16) may be a mechanical latch controller (as shown in FIG. 2A) that is mechanically coupled to the mechanical child lock system (e.g., child lock system 14). For example, the interior latch controller (as shown in FIG. 2A) may be a traditional door latch lever that is coupled to the mechanical child lock system (e.g., child lock system 14) with a linkage assembly (e.g., linkage assembly 30).

The mechanical latch controller (e.g., interior latch controller 16) may be configured to provide a mechanical unlatch signal (e.g., mechanical unlatch signal 32) to the mechanical child lock system (e.g., child lock system 14). For example and when this door latch lever (e.g., interior latch controller 16) is actuated (e.g., when one of the rear seat passengers attempts to open the rear door of vehicle 12), this mechanical unlatch signal (e.g., mechanical unlatch signal 32) may be provided to the mechanical child lock system (e.g., child lock system 14).

Accordingly and if the mechanical child lock system (e.g., child lock system 14) is not activated, the mechanical unlatch signal (e.g., mechanical unlatch signal 32) WILL be provided to the door latch mechanism (e.g., door latch mechanism 18) and, therefore, the rear door of vehicle 12 WILL unlatch and open. However and if the mechanical child lock system (e.g., child lock system 14) is activated, the mechanical unlatch signal (e.g., mechanical unlatch signal 32) WILL NOT be provided to the door latch mechanism (e.g., door latch mechanism 18) and, therefore, the rear door of vehicle 12 WILL NOT unlatch and will not open.

In this configuration, the door latch mechanism (e.g., door latch mechanism 18) may be a mechanically-actuated door latch mechanism, wherein the mechanical unlatch signal (e.g., mechanical unlatch signal 32) passes through the mechanical child lock system (e.g., child lock system 14) and is provided to the door latch mechanism (e.g., door latch mechanism 18). However and in other configurations, the door latch mechanism (e.g., door latch mechanism 18) may be an electrically-actuated door latch mechanism, wherein the mechanical unlatch signal (e.g., mechanical unlatch signal 32) is converted to an electrical unlatch signal (e.g., by child lock system 14) that is provided to the door latch mechanism (e.g., door latch mechanism 18).

As discussed above, the override system (e.g., override system 20) may be configured to receive an override signal (e.g., override signal 22) from the vehicle (e.g., vehicle 12) and reconnect the interior latch controller (e.g., interior latch controller 16) with the door latch mechanism (e.g., door latch mechanism 18), thus reactivating the interior latch controller (e.g., interior latch controller 16). Accordingly and even if the mechanical child lock system (e.g., child lock system 14) is activated, override system 20 (upon receiving override signal 22 from vehicle 12) will reconnect the interior latch controller (e.g., interior latch controller 16) with the door latch mechanism (e.g., door latch mechanism 18), thus enabling the mechanical unlatch signal (e.g., mechanical unlatch signal 32) to be provided to the door latch mechanism (e.g., door latch mechanism 18), resulting in the rear door of vehicle 12 unlatching and opening. In such a configuration, one or more actuators (not shown) may be included within the mechanical child lock system (e.g., child lock system 14) to enable manipulation of mechanical switch 24 in the event of the override system (e.g., override system 20) receiving the override signal (e.g., override signal 22).

Additionally/alternatively, the child lock system (e.g., child lock system 14) may be an electrical child lock system (e.g., child lock system 14) configured to selectively electrically disconnect the interior latch controller (e.g., interior latch controller 16) from the door latch mechanism (e.g., door latch mechanism 18), thus selectively electrically deactivating the interior latch controller (e.g., interior latch controller 16).

The electrical child lock system (e.g., child lock system 14) may be selectively engageable via an electrical switch (e.g., electrical switch 34) positioned proximate the driver (e.g., driver 28) of the vehicle (e.g., vehicle 12). Accordingly and through the use of this electrical switch (e.g., electrical switch 34), the driver (e.g., driver 28) of the vehicle (e.g., vehicle 12) may selectively activate/deactivate the electrical child lock system (e.g., child lock system 14).

The interior latch controller (e.g., interior latch controller 16) may be an electrical latch controller (as shown in FIG. 2B) that is electrically coupled to the electrical child lock system (e.g., child lock system 14). For example, the interior latch controller (as shown in FIG. 2B) may be a latch button assembly that is coupled to the electrical child lock system (e.g., child lock system 14) with a wire assembly (e.g., wire assembly 36).

The electrical latch controller (e.g., interior latch controller 16) may be configured to provide an electrical unlatch signal (e.g., electrical unlatch signal 38) to the electrical child lock system (e.g., child lock system 14). For example and when this latch button assembly (e.g., interior latch controller 16) is actuated (e.g., when one of the rear seat passengers attempts to open the rear door of vehicle 12), this electrical unlatch signal (e.g., electrical unlatch signal 38) may be provided to the electrical child lock system (e.g., child lock system 14).

Accordingly and if the electrical child lock system (e.g., child lock system 14) is not activated, the electrical unlatch signal (e.g., electrical unlatch signal 38) WILL be provided to the door latch mechanism (e.g., door latch mechanism 18) and, therefore, the rear door of vehicle 12 WILL unlatch and open. However and if the electrical child lock system (e.g., child lock system 14) is activated, the electrical unlatch signal (e.g., electrical unlatch signal 38) WILL NOT be provided to the door latch mechanism (e.g., door latch mechanism 18) and, therefore, the rear door of vehicle 12 WILL NOT unlatch and will not open.

In this configuration, the door latch mechanism (e.g., door latch mechanism 18) may be an electrically-actuated door latch mechanism, wherein the electrical unlatch signal (e.g., electrical unlatch signal 38) passes through the electrical child lock system (e.g., child lock system 14) and is provided to the door latch mechanism (e.g., door latch mechanism 18). However and in other configurations, the door latch mechanism (e.g., door latch mechanism 18) may be a mechanically-actuated door latch mechanism, wherein the electrical unlatch signal (e.g., electrical unlatch signal 38) is converted to a mechanical unlatch signal (e.g., by child lock system 14) that is provided to the door latch mechanism (e.g., door latch mechanism 18).

As discussed above, the override system (e.g., override system 20) may be configured to receive an override signal (e.g., override signal 22) from the vehicle (e.g., vehicle 12) and reconnect the interior latch controller (e.g., interior latch controller 16) with the door latch mechanism (e.g., door latch mechanism 18), thus reactivating the interior latch controller (e.g., interior latch controller 16). Accordingly and even if the electrical child lock system (e.g., child lock system 14) is activated, override system 20 (upon receiving override signal 22 from vehicle 12) will reconnect the interior latch controller (e.g., interior latch controller 16) with the door latch mechanism (e.g., door latch mechanism 18), thus enabling the electrical unlatch signal (e.g., electrical unlatch signal 38) to be provided to the door latch mechanism (e.g., door latch mechanism 18), resulting in the rear door of vehicle 12 unlatching and opening. In such a configuration, one or more relays (not shown) may be included within the electrical child lock system (e.g., child lock system 14) to enable the electrical unlatch signal (e.g., electrical unlatch signal 38) to be provided to the door latch mechanism (e.g., door latch mechanism 18) in the event of the override system (e.g., override system 20) receiving the override signal (e.g., override signal 22).

The override signal (e.g., override signal 22) may be an electrical override signal (e.g., override signal 22), wherein this override signal (e.g., override signal 22) may allow for the opening of the rear doors of the vehicle (e.g., vehicle 12) even if the child lock system (e.g., child lock system 14) is activated.

For example, the electrical override signal (e.g., override signal 22) may be provided by the vehicle (e.g., vehicle 12) in the event of an emergency situation (e.g., a fire event, a rollover event, an engine failure event) concerning the vehicle (e.g., vehicle 12). Such an emergency situation may be sensed by various sensors (e.g., sensor 40) positioned within vehicle 12. For example, an orientation sensor may be configured to sense the orientation of vehicle 12 (e.g., upside down versus right-side up); a thermal/smoke sensor may be configured to senser heat or smoke inside vehicle 12; an engine sensor may be configured to sense an engine failure event; etc. Accordingly and in the event of such an emergency situation occurring, this electrical override signal (e.g., override signal 22) may be automatically provided to the override system (e.g., override system 20) to enable the rear seat occupants to open the rear doors of the vehicle (e.g., vehicle 12) even if the child lock system (e.g., child lock system 14) is activated.

Additionally, the electrical override signal (e.g., override signal 22) may be provided by the vehicle (e.g., vehicle 12) in the event of an accident concerning the vehicle (e.g., vehicle 12). Accordingly and in the event of such an accident situation occurring (e.g., a high-G deceleration event or an airbag deployment concerning vehicle 12), this electrical override signal (e.g., override signal 22) may be automatically provided to the override system (e.g., override system 20) to enable the rear seat occupants to open the rear doors of the vehicle (e.g., vehicle 12) even if the child lock system (e.g., child lock system 14) is activated.

GENERAL

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. An automatically-deactivated child safety lock system for use within a vehicle comprising:

a child lock system configured to selectively mechanically disconnect an interior latch controller from a door latch mechanism, thus selectively deactivating the interior latch controller, wherein the child lock system is a mechanical child lock system configured to selectively mechanically disconnect the interior latch controller from the door latch mechanism, thus selectively mechanically deactivating the interior latch controller; and an override system configured to receive an override signal from the vehicle and mechanically reconnect the interior latch controller with the door latch mechanism using one or more actuators within the child lock system to reconnect the interior latch controller with the door latch mechanism, thus reactivating the interior latch controller, wherein the override signal is an electrical override signal and is provided by the vehicle in the event of an emergency situation concerning the vehicle, wherein the emergency situation includes one or more of a fire event, a rollover event, and an engine failure event.

2. The automatically-deactivated child safety lock system of claim 1 wherein the interior latch controller is a mechanical latch controller that is mechanically coupled to the mechanical child lock system.

3. The automatically-deactivated child safety lock system of claim 2 wherein the mechanical latch controller is configured to provide a mechanical unlatch signal to the mechanical child lock system.

4. The automatically-deactivated child safety lock system of claim 1 wherein the mechanical child lock system is selectively engageable via a mechanical switch located within a doorjamb of the vehicle.

5. The automatically-deactivated child safety lock system of claim 1 wherein the electrical override signal is provided by the vehicle in the event of an accident concerning the vehicle.

6. An automatically-deactivated child safety lock system for use within a vehicle comprising:

an interior latch controller;

a door latch mechanism;

a child lock system configured to selectively mechanically disconnect an interior latch controller from a door latch mechanism, thus selectively deactivating the interior latch controller, wherein the child lock system is a mechanical child lock system configured to selectively mechanically disconnect the interior latch controller from the door latch mechanism, thus selectively mechanically deactivating the interior latch controller; and an override system configured to receive an override signal from the vehicle and mechanically reconnect the interior latch controller with the door latch mechanism using one or more actuators within the child lock system to reconnect the interior latch controller with the door latch mechanism, thus reactivating the interior latch controller, wherein the override signal is an electrical override signal and is provided by the vehicle in the event of an emergency situation concerning the vehicle, wherein the emergency situation includes one or more of a fire event, a rollover event, and an engine failure event.

7. The automatically-deactivated child safety lock system of claim 6 wherein the child lock system is a mechanical child lock system configured to selectively mechanically disconnect the interior latch controller from the door latch mechanism, thus selectively mechanically deactivating the interior latch controller.

8. The automatically-deactivated child safety lock system of claim 7 wherein the interior latch controller is a mechanical latch controller that is mechanically coupled to the mechanical child lock system.

9. The automatically-deactivated child safety lock system of claim 8 wherein the mechanical latch controller is configured to provide a mechanical unlatch signal to the mechanical child lock system.

10. The automatically-deactivated child safety lock system of claim 7 wherein the mechanical child lock system is selectively engageable via a mechanical switch located within a doorjamb of the vehicle.

11. The automatically-deactivated child safety lock system of claim 6 wherein the child lock system is an electrical child lock system configured to selectively electrically disconnect the interior latch controller from the door latch mechanism, thus selectively electrically deactivating the interior latch controller.

12. The automatically-deactivated child safety lock system of claim 11 wherein the interior latch controller is an electrical latch controller that is electrically coupled to the electrical child lock system.

13. The automatically-deactivated child safety lock system of claim 12 wherein the electrical latch controller is configured to provide an electrical unlatch signal to the electrical child lock system.

14. The automatically-deactivated child safety lock system of claim 11 wherein the electrical child lock system is selectively engageable via an electrical switch positioned proximate a driver of the vehicle.

15. The automatically-deactivated child safety lock system of claim 6 wherein the electrical override signal is provided by the vehicle in the event of an accident concerning the vehicle.

16. An automatically-deactivated child safety lock system for use within a vehicle comprising:

a child lock system configured to selectively mechanically disconnect an interior latch controller from a door latch mechanism, thus selectively deactivating the interior latch controller, wherein the child lock system is a mechanical child lock system configured to selectively mechanically disconnect the interior latch controller from the door latch mechanism, thus selectively mechanically deactivating the interior latch controller; and an override system configured to receive an override signal from the vehicle and mechanically reconnect the interior latch controller with the door latch mechanism using one or more actuators within the child lock system to reconnect the interior latch controller with the door latch mechanism, thus reactivating the interior latch controller, wherein the override signal is an electrical override signal and is provided by the vehicle in the event of an emergency situation concerning the vehicle, wherein the emergency situation includes one or more of a fire event, a rollover event, and an engine failure event;

wherein the child lock system is a mechanical child lock system configured to selectively mechanically disconnect the interior latch controller from the door latch mechanism, thus selectively mechanically deactivating the interior latch controller, and wherein the interior latch controller is a mechanical latch controller that is mechanically coupled to the mechanical child lock system.

17. The automatically-deactivated child safety lock system of claim 16 wherein the mechanical latch controller is configured to provide a mechanical unlatch signal to the mechanical child lock system.

18. The automatically-deactivated child safety lock system of claim 1 wherein the mechanical child lock system is selectively engageable via a mechanical switch located within a door jamb of the vehicle.

19. The automatically-deactivated child safety lock system of claim 16 wherein the electrical override signal is provided by the vehicle in the event of an accident concerning the vehicle.

* * * * *